United States Patent
Eckl et al.

(10) Patent No.: US 11,248,488 B2
(45) Date of Patent: Feb. 15, 2022

(54) METHOD FOR MAKING A TWIN-VANED NOZZLE RING ASSEMBLY FOR A TURBOCHARGER WITH TWIN-SCROLL TURBINE HOUSING FOR DIRECTING EXHAUST GASES FROM EACH SCROLL ONTO TURBINE WHEEL IN INTERLEAVED FASHION

(71) Applicant: Garrett Transportation I Inc., Torrance, CA (US)

(72) Inventors: Filip Eckl, Trbouany (CZ); Petr Pribyl, ar nad Sazavou (CZ); Petr Skara, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 60 days.

(21) Appl. No.: 16/421,703

(22) Filed: May 24, 2019

(65) Prior Publication Data
US 2020/0291808 A1    Sep. 17, 2020

Related U.S. Application Data

(63) Continuation-in-part of application No. 16/351,470, filed on Mar. 12, 2019, now Pat. No. 11,085,311.

(51) Int. Cl.
*F01D 13/02* (2006.01)
*F02B 37/02* (2006.01)
(Continued)

(52) U.S. Cl.
CPC ............. *F01D 13/02* (2013.01); *F01D 9/041* (2013.01); *F02B 37/007* (2013.01); *F02B 37/025* (2013.01); *F05D 2220/40* (2013.01)

(58) Field of Classification Search
CPC ........ F01D 9/026; F01D 9/045; F02B 37/025; Y10T 29/4932
(Continued)

(56) References Cited

U.S. PATENT DOCUMENTS 2,739,782 A * 3/1956 White ................ F01D 9/045
                                                     415/17
4,027,994 A    6/1977 MacInnes
(Continued)

FOREIGN PATENT DOCUMENTS

DE    102011120555 A1 *  6/2013  ........... F01D 17/167
EP    2025897 A2    2/2009
(Continued)

OTHER PUBLICATIONS

DE-102011120555-A1 Machine Translation (Year: 2013).*
Extended Search Report for EP Appl. No. 20165134.6-1004, dated Jul. 3, 2020.

*Primary Examiner* — Jacob J Cigna
*Assistant Examiner* — Michael W Hotchkiss
(74) *Attorney, Agent, or Firm* — John C. James

(57) ABSTRACT

A twin-vaned nozzle ring for a turbine nozzle of a turbocharger nozzle ring is made by assembling the nozzle ring from three separately formed parts. A center part includes a first ring of circumferentially spaced first vanes and a second ring of circumferentially spaced second vanes, the first and second rings being axially spaced and integrally joined to each other. The first vanes are circumferentially offset from the second vanes, and exits from the first vane passages are radially aligned with and circumferentially interleaved with exits from the second vane passages. First and second side walls are provided as separate parts. Finally, the first side wall is joined to a distal or outer face of the first ring, and
(Continued)

the second side wall is joined to a distal face of the second ring to complete the assembly.

11 Claims, 9 Drawing Sheets

(51) Int. Cl.
*F02B 37/007* (2006.01)
*F01D 9/04* (2006.01)
(58) Field of Classification Search
USPC .............................................. 415/149.1, 193
See application file for complete search history.

(56) References Cited

U.S. PATENT DOCUMENTS

| | | | |
|---|---|---|---|
| 5,092,126 A | 3/1992 | Yano | |
| 6,260,358 B1 | 7/2001 | Daudel et al. | |
| 6,726,447 B2 * | 4/2004 | Lutz | F01D 17/143 |
| | | | 415/158 |
| 7,828,517 B2 | 11/2010 | Serres | |
| 8,590,305 B2 | 11/2013 | Anschel et al. | |
| 8,857,178 B2 * | 10/2014 | O'Hara | F01D 9/026 |
| | | | 29/889.2 |
| 9,017,017 B2 * | 4/2015 | Sausse | F01D 17/165 |
| | | | 415/160 |
| 9,157,396 B2 | 10/2015 | Lusardi et al. | |
| 10,227,889 B2 * | 3/2019 | Arnold | F01D 5/043 |
| 10,612,458 B2 * | 4/2020 | Parker | F02B 37/24 |
| 10,648,360 B1 * | 5/2020 | Musil | F01D 9/045 |
| 10,927,700 B2 * | 2/2021 | Florindo | F01D 17/143 |
| 2007/0180826 A1 | 8/2007 | Sumser et al. | |
| 2007/0209361 A1 * | 9/2007 | Pedersen | F02B 37/025 |
| | | | 60/602 |
| 2009/0290980 A1 | 11/2009 | Higashimori | |
| 2011/0194929 A1 | 8/2011 | Denholm et al. | |
| 2013/0000300 A1 * | 1/2013 | O'Hara | F02B 37/22 |
| | | | 60/605.2 |
| 2014/0294576 A1 | 10/2014 | Fledersbacher et al. | |
| 2015/0013332 A1 | 1/2015 | Nasir et al. | |
| 2015/0093236 A1 * | 4/2015 | Faeth | F01D 17/14 |
| | | | 415/148 |
| 2015/0345316 A1 * | 12/2015 | Henderson | F01D 9/026 |
| | | | 415/204 |
| 2017/0082018 A1 * | 3/2017 | Bayod | F01D 25/24 |
| 2017/0234153 A1 * | 8/2017 | Williams | F02B 33/40 |
| | | | 415/148 |
| 2018/0266268 A1 * | 9/2018 | Karstadt | F02C 6/12 |

FOREIGN PATENT DOCUMENTS

| | | | | |
|---|---|---|---|---|
| GB | 2562501 A | * | 11/2018 | ............. F01D 9/026 |
| GB | 2562501 A | | 11/2018 | |
| JP | 2012219640 A | | 11/2012 | |

* cited by examiner

METHOD FOR MAKING A TWIN-VANED NOZZLE RING ASSEMBLY FOR A TURBOCHARGER WITH TWIN-SCROLL TURBINE HOUSING FOR DIRECTING EXHAUST GASES FROM EACH SCROLL ONTO TURBINE WHEEL IN INTERLEAVED FASHION

BACKGROUND OF THE INVENTION

The present disclosure relates to turbochargers in which a turbine of the turbocharger is driven by exhaust gas from a reciprocating engine. The invention relates more particularly to turbine housings that are divided into a plurality of substantially separate sections each fed by a separate exhaust system.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

In multiple-piston reciprocating engines, it is known to design the exhaust system in such a manner as to take advantage of the pressure pulsation that occurs in the exhaust stream. In particular, it is known to employ what is known as "pulse separation" wherein the cylinders of the engine are divided into a plurality of groups, and the pulses from each group of cylinders are substantially isolated from those of the other groups by having independent exhaust passages for each group. To take best advantage of pulse separation, it is desired to minimize the communication or "cross talk" between the separate groups of cylinders. Accordingly, in the case of a turbocharged engine, it is advantageous to maintain separate exhaust passages all the way into the turbine of the turbocharger. Thus, the turbine housing into which the exhaust gases are fed is typically divided into a plurality of substantially separate parts.

There are two basic ways in which turbine housings have been divided: (1) sector division, and (2) meridional division. In a sector-divided turbine housing, the generally annular chamber is divided into angular sectors each of which occupies only a part of the circumference such that the passages succeed each other in the circumferential direction, such as shown in FIG. 2 of U.S. Pat. No. 6,260,358. Sector division of the turbine housing is advantageous from a flow-separation point of view, but the out-of-phase exhaust gas pulses from the two sectors can induce unwanted turbocharger shaft motion.

In a meridionally divided turbine housing, the scroll or chamber that surrounds the turbine wheel and into which the exhaust gases are fed is divided into a plurality of scrolls that succeed one another in the axial direction, each scroll occupying substantially a full circumference, such as shown in FIG. 4 of U.S. Pat. No. 4,027,994. Meridional division of the turbine housing is advantageous from a shaft motion point of view, but the exhaust gas flow from each scroll impinges on less than the full axial width of the turbine blade leading edges, which negatively affects turbine efficiency because of mixing losses.

The present disclosure relates to turbochargers having turbine housings of the meridionally divided type.

BRIEF SUMMARY OF THE DISCLOSURE

The present disclosure relates to a turbocharger having a meridionally divided scroll, and particularly relates to methods for making a twin-vaned nozzle ring that allows the separate exhaust gas streams from the two scrolls to be blown onto the turbine wheel in an interleaved fashion about the circumference of the wheel. In accordance with embodiments described and illustrated herein, a method for making a twin-vaned nozzle ring assembly for a turbine nozzle of a turbocharger comprises the steps of:

(a) providing a first side wall as a ring-shaped part;

(b) providing a second side wall as a ring-shaped part, the second side wall being formed separately from the first side wall;

(c) providing a nozzle ring separately from the first and second side walls, wherein the nozzle ring is provided to have a first vane ring comprising first vanes circumferentially spaced about a circumference of the nozzle ring and is provided to have a second vane ring comprising second vanes circumferentially spaced about the circumference of the nozzle ring, the first and second vane rings being axially spaced and integrally joined to each other, the first vane ring defining first vane passages between circumferentially successive first vanes, the second vane ring defining second vane passages between circumferentially successive second vanes, wherein the first vane passages have respective first vane passage entrances and first vane passage exits, wherein the second vane passages have respective second vane passage entrances and second vane passage exits, wherein the first vanes are circumferentially offset from the second vanes, the first vane passage entrances are axially spaced apart from the second vane passage entrances, and the first vane passage exits are radially aligned with and circumferentially interleaved with the second vane passage exits; and (d) joining the first side wall to a distal face of the first vane ring, and joining the second side wall to a distal face of the second vane ring.

Because each of the two vane rings blows exhaust gas on the turbine wheel all the way around its circumference, and the jets from the first and second vane passages are interleaved about the circumference, nozzle ring assemblies made in accordance with the method of the invention can mitigate the shaft motion and mixing-loss issues that can affect some prior-art turbines of the sector-divided and meridionally divided types. Nozzle ring assemblies made in accordance with the invention can maintain good flow isolation between the two streams of exhaust gas all the way to the turbine wheel, thereby taking full advantage of utilization and separation of exhaust manifold pressure pulses.

In some embodiments, there can be symmetry between the first and second vane passages in terms of them having substantially equal respective flow areas. In other embodiments, however, the flow area of the first vane passages can differ from the flow area of the second vane passages so that one scroll contributes a greater fraction of the total exhaust gas flow than does the other scroll, while at the same time the volumes of the first and second scrolls optionally can be equal.

In some embodiments, the first vane passages can be configured so that each first exhaust gas jet impinges on a full extent of the turbine blade leading edges, and similarly the second vane passages can be configured so that each second exhaust gas jet impinges on the full extent of the turbine blade leading edges. In other embodiments, each of the first and second vane passages can be configured so that the first as well as the second exhaust gas jets impinge on less than the full extent of the leading edges.

In accordance with one embodiment of the invention, the first side wall can include a plurality of depressed vane receptacles in a face of the first side wall that confronts the distal face of the first vane ring, each said depressed vane receptacle receiving a distal end of a respective first vane. Similarly, the second side wall can include a plurality of depressed vane receptacles in a face of the second side wall that confronts the distal face of the second vane ring, each said depressed vane receptacle receiving a distal end of a respective second vane.

The nozzle ring can be made by an injection molding process, one non-limiting example of which is a metal injection molding (MIM) process.

Assembly of the first and second side walls with the nozzle ring can be accomplished by using pins. In one embodiment, each side wall and the two opposite distal faces of the nozzle ring are provided to have pin receptacles, the pin receptacles in each side wall being aligned with corresponding pin receptacles in the respective face of the nozzle ring. Pins are press-fit into the pin receptacles in each face of the nozzle ring and into the pin receptacles of each side wall to complete the assembly.

In another embodiment, the first and second vane rings include integrally formed pins projecting from each of the opposite distal faces of the nozzle ring, and the side walls include pin receptacles. The pins are inserted into the pin receptacles in the side walls and then are affixed therein, such as by riveting or any other suitable fastening technique.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. References herein to "radial", "circumferential", and "axial" (or equivalently, to the cylindrical coordinates r, θ, z respectively) are with respect to the turbocharger rotational axis, the axial direction being along or parallel to the rotational axis, the radial direction extending perpendicularly from the rotational axis, and the circumferential direction being about the rotational axis.

Figure 1:
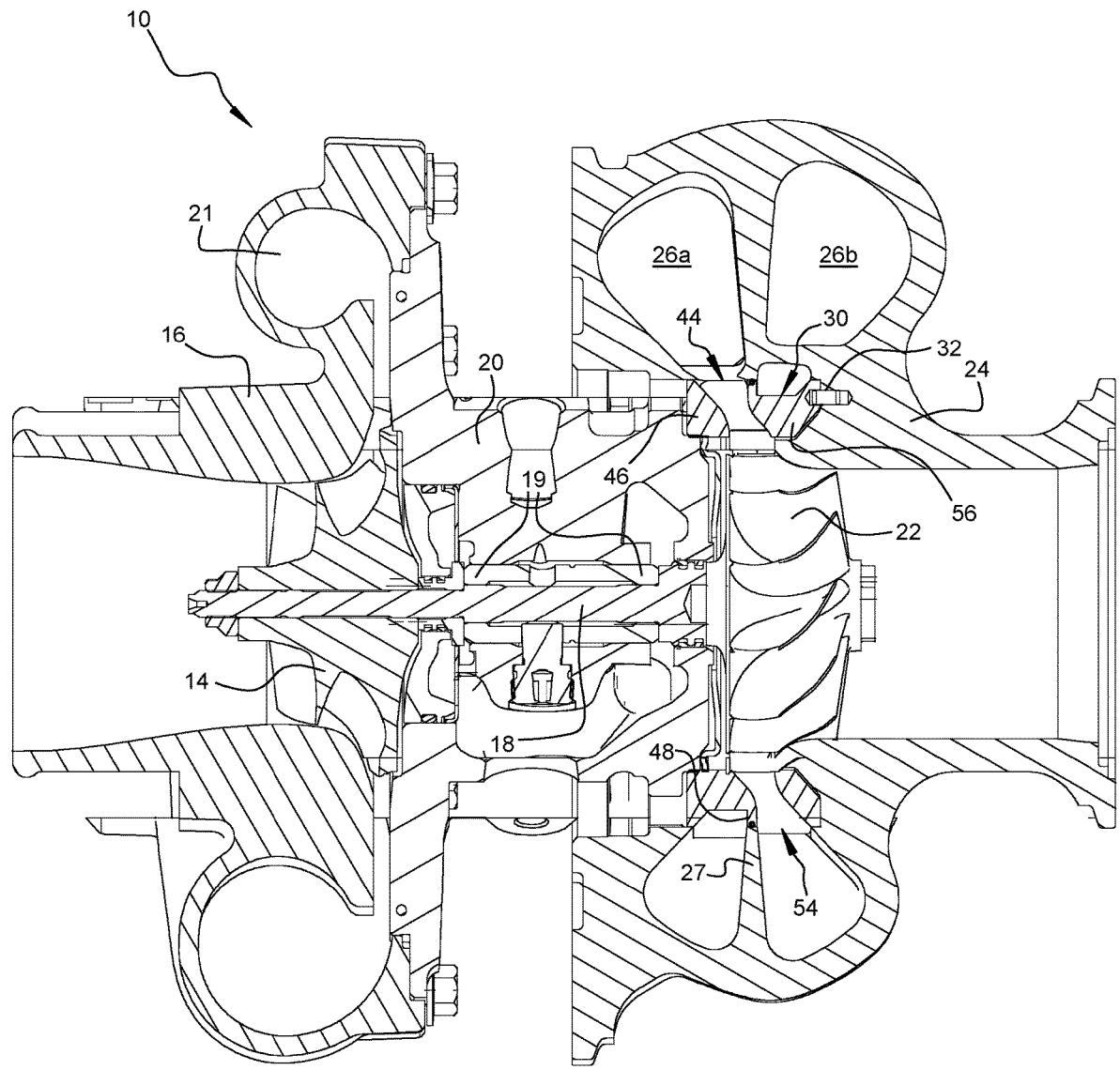
FIG. 1 is an axial cross-sectional view of a turbocharger having a twin-vaned nozzle ring assembly that can be made by a method in accordance with the invention.

A turbocharger 10 suitable for employing a nozzle ring assembly made in accordance with the present invention is shown in FIG. 1. The turbocharger includes a compressor wheel or impeller 14 disposed in a compressor housing 16 and mounted on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to a volute 21, which collects the compressed air for supply to the intake of an internal combustion engine (not shown) for boosting the performance of the engine.

The turbocharger also includes a turbine housing 24 that houses the turbine wheel 22. As previously noted, in reciprocating internal combustion engines having a plurality of cylinders, it is advantageous to design the exhaust system in such a manner as to take advantage of the pressure pulsation that occurs in the exhaust streams discharged from the cylinders. In particular, it is advantageous to employ what is known as "pulse separation" wherein the cylinders of the engine are divided into a plurality of groups, and the pulses from each group of cylinders are substantially isolated from those of the other groups by having independent exhaust passages for each group. To take best advantage of pulse separation, it is desired to minimize the communication or "cross talk" between the separate groups of cylinders. In the case of a turbocharged engine, it is advantageous to maintain separate exhaust passages all the way into the turbine of the turbocharger. To this end, the turbine housing typically has a divided scroll, comprising two separate scrolls that respectively receive separate streams of exhaust gas.

Thus, as shown in FIG. 1, the turbine housing 24 defines a meridionally divided scroll comprising a first scroll 26a and a second scroll 26b, which are separated from each other by a divider wall 27. The second scroll succeeds the first scroll in the axial direction of the turbocharger, and each scroll receives exhaust gas via a separate exhaust gas inlet defined by the turbine housing. In accordance with the invention, the two streams of exhaust gas are isolated from each other all the way to the turbine wheel 22, via a nozzle ring assembly 30 that separately directs the two streams of exhaust gas onto the turbine wheel. The nozzle ring assembly is disposed within the turbine housing 24 adjacent to the center housing 20.

Figure 2:
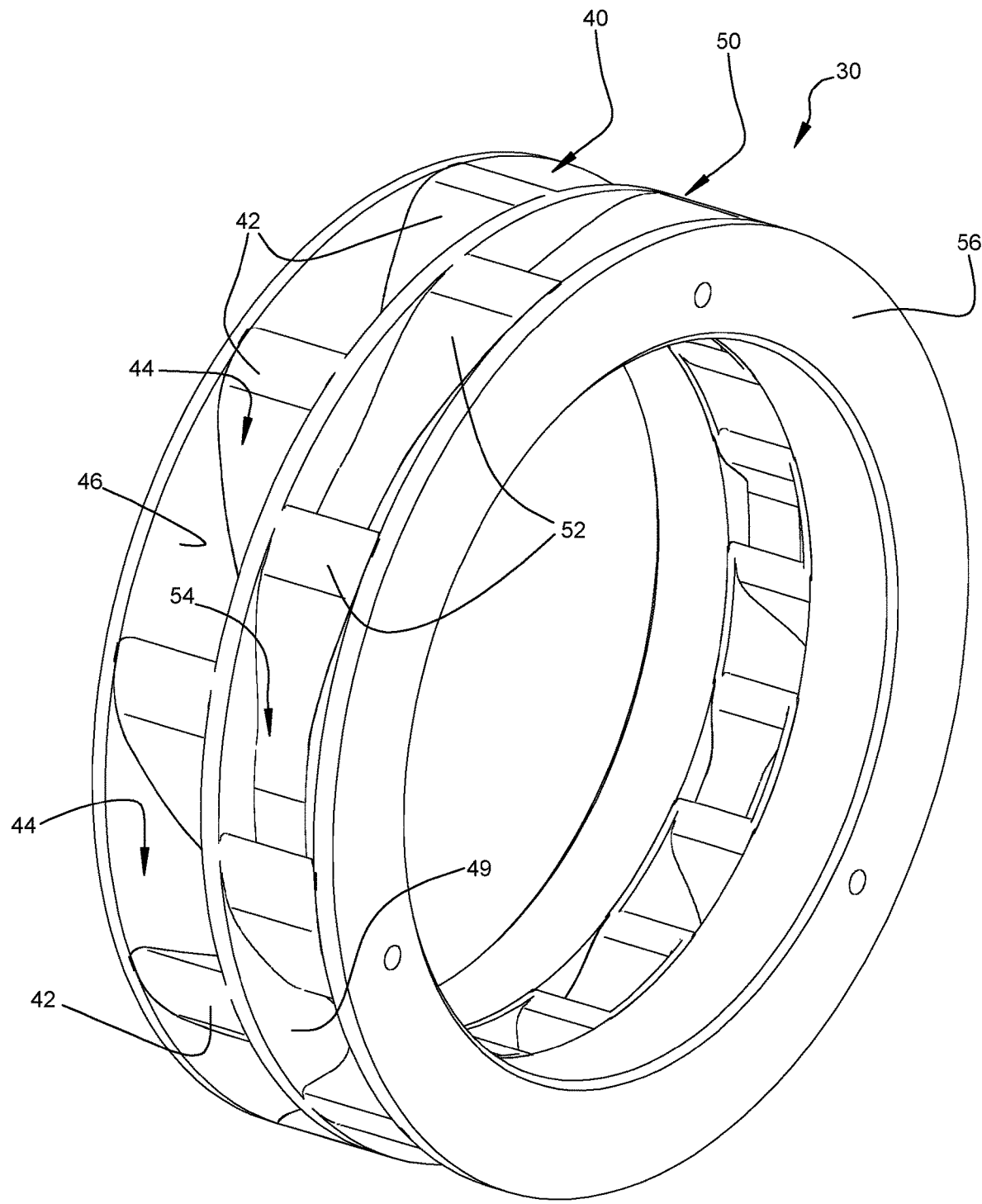
FIG. 2 is an isometric view of the nozzle ring assembly in accordance with a first embodiment of the invention.

With reference to FIG. 2, the nozzle ring assembly 30 defines a first vane ring 40 comprising first vanes 42 circumferentially spaced about a circumference of the nozzle ring, and a second vane ring 50 comprising second vanes 52 circumferentially spaced about the circumference of the nozzle ring. The first ring 40 defines first vane passages 44 between circumferentially successive first vanes 42. Similarly, the second ring 50 defines second vane passages 54 between circumferentially successive second vanes 52. The first vane passages 44 are circumferentially staggered relative to the second vane passages 54. Stated differently, the array of second vanes 52 is "clocked" circumferentially about the nozzle ring axis relative to the array of first vanes 42, by an angular amount that is less than an angular spacing between adjacent first vanes. In the illustrated embodiment, the second vane passages are circumferentially staggered from the first vane passages by approximately half of a circumferential spacing between the leading edge of one first vane 42 and the leading edge of the next first vane 42 in the circumferential direction. Fluid isolation of the two sets of vane passages 44 and 54 is accomplished by a partition 49 comprising a generally annular wall, wherein ends of the first vanes 42 are joined to one face of the partition 49 and ends of the second vanes 52 are joined to the opposite face of the partition.

The nozzle ring assembly 30 includes a first end wall 46 and a second end wall 56. The first end wall 46 is axially spaced from the partition 49, and the opposite ends of the first vanes 42 from the partition are joined to the first end wall. The second end wall 56 is axially spaced on the other side of the partition, and the opposite ends of the second vanes 52 from the partition are joined to the second end wall. To prevent the nozzle ring assembly from rotating relative to the turbine housing 24, the nozzle ring can be provided with an anti-rotation feature, or a plurality of such features. In one non-limiting embodiment, the anti-rotation feature can comprise one or more pins 32 (FIG. 1). The nozzle ring assembly can define receptacles in the second end wall 56 (or alternatively, or additionally, in the first end wall 46), which align with corresponding receptacle(s) in the turbine housing 24, and each pair of aligned receptacles can be kept in alignment by one of said anti-rotation pins 32. In an exemplary embodiment, there are three such anti-rotation pins circumferentially spaced about the circumference of the nozzle ring. Other types of anti-rotation features are possible in the practice of the invention, examples of which include but are not limited to radially oriented pins engaged in holes or slots in the turbine housing, integral features such as protuberances formed on the nozzle ring assembly for engaging corresponding slots or notches in the turbine housing, and the like.

The radially innermost extremity of the divider wall 27 of the turbine housing 24 is adjacent to a radially outer periphery of the partition 49 of the nozzle ring assembly 30 as best seen in FIG. 1. The interface between the divider wall and the nozzle ring can be sealed with a seal (e.g., an O-ring or any other suitable type of seal). Alternatively, however, it may be desired in a particular case to have a defined clearance between the divider wall and the nozzle ring, the size of the clearance being selected so as to regulate the degree of fluid isolation between the two exhaust gas streams.

The first vane passages 44 are positioned to receive exhaust gas from only the first scroll 26a and an exit from each first vane passage 44 directs a first exhaust gas jet onto the turbine blade leading edges. Similarly, the second vane passages 54 are positioned to receive exhaust gas from only the second scroll 26b and an exit from each second vane passage 54 directs a second exhaust gas jet onto the turbine blade leading edges.

Because of the circumferential offset between the two sets of vanes 42 and 52, the turbine blade leading edges receive the first and second exhaust gas jets, respectively, from the first and second vane passages 44 and 54 in interleaved fashion about a circumference of the turbine wheel. That is, one circumferential sector of the wheel receives a first exhaust gas jet from a first vane passage, an adjacent circumferential sector receives a second exhaust gas jet from a second vane passage, the next circumferential sector receives a first exhaust gas jet from the next adjacent first vane passage, and so forth in alternating or interleaved fashion about the entire circumference of the wheel.

As previously noted, the nozzle ring assembly in accordance with embodiments of the invention is able to mitigate some of the drawbacks of both meridionally divided and sector-divided turbine housing designs according to the prior art. With respect to sector-divided turbine housings, the out-of-phase pulses directed against the turbine wheel from the two 180-degree sectors can induce undesired turbocharger shaft motion. In contrast, the nozzle ring assembly of the invention distributes the out-of-phase pulses evenly about the turbine wheel circumference, thereby tending to reduce or eliminate such excessive shaft motion. With respect to meridionally divided turbine housings, because each scroll feeds exhaust gas to only about half of the width of the turbine blade leading edges, substantial mixing losses can occur, adversely affecting turbine efficiency. The nozzle ring assembly according to embodiments of the invention can mitigate both the shaft-motion issue and the mixing-loss issue because the two scrolls feed exhaust gas alternately (i.e., in interleaved fashion) about the entire circumference (and in some embodiments can also blow exhaust gas on the full extent of the turbine blade leading edges).

The nozzle ring assembly provides the ability to control the flow split between the two scrolls. For example, an uneven or asymmetric flow split can be achieved by sizing the vane passages for one scroll smaller than the vane passages for the other scroll. In such case, it may be advantageous for the scrolls to be of equal volume.

The shapes of the entrance and exit sides of the vane passages 44 and 54 can be selected by the designer. In some embodiments, the vane passage exits can be generally rectangular; in other embodiments they can be oval. The entrance of a given vane passage does not necessarily have to have a shape like that of the exit of the passage. For example, a vane passage entrance can be rectangular and the exit can be round or oval, or vice versa. In the case noted above in which the vane passages for one scroll are smaller than the vane passages for the other scroll, the shapes of the vane passage exits can differ between the two scrolls. As one non-limiting example, the vane passage exits for one scroll can be rectangular and the vane passage exits for the other scroll can be oval and smaller in flow area than the rectangular exits.

In the illustrated embodiment, the second vane passages 54 are circumferentially staggered relative to the first vane passages 44 such that there is no circumferential overlap between a given second exhaust gas jet and the neighboring first exhaust gas jet. However, the invention is not limited in this sense, and in other (non-illustrated) embodiments the vanes can be configured such that there is some circumferential overlap between the respective first exhaust gas jets and second exhaust gas jets. Additionally, in other (non-illustrated) embodiments, each of the first and second vane rings can blow exhaust gas on less than the full width or extent of the turbine blade leading edges, and in that case there can be overlap in the axial direction (and optionally in the circumferential direction also) between the first exhaust gas jets and the second exhaust gas jets.

Figure 3:
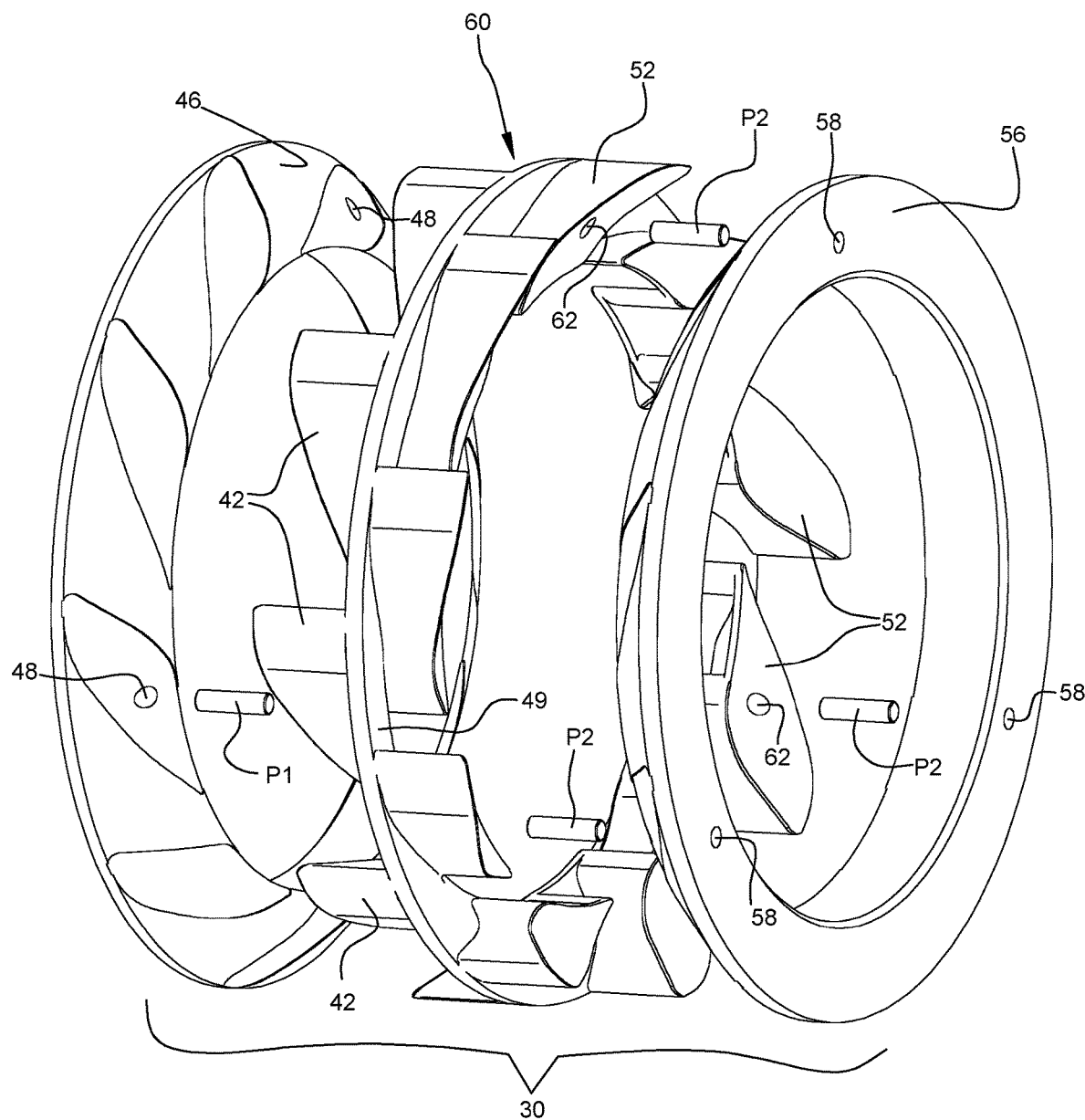
FIG. 3 is an exploded view of the nozzle ring assembly in accordance with the first embodiment of the invention.

The present invention relates particularly to methods for making the nozzle ring assembly 30 such as shown in FIG. 2. In accordance with the invention, the nozzle ring assembly comprises three main components as shown in FIG. 3: a nozzle ring 60 defining the vanes, a first side wall 46, and a second side wall 56. These three components are manufactured as separate parts, which are subsequently assembled to form the nozzle ring assembly 30 as described below. The nozzle ring 60 can be made by an injection molding process, one non-limiting example of which is a metal injection molding (MIM) process.

Figure 4A:
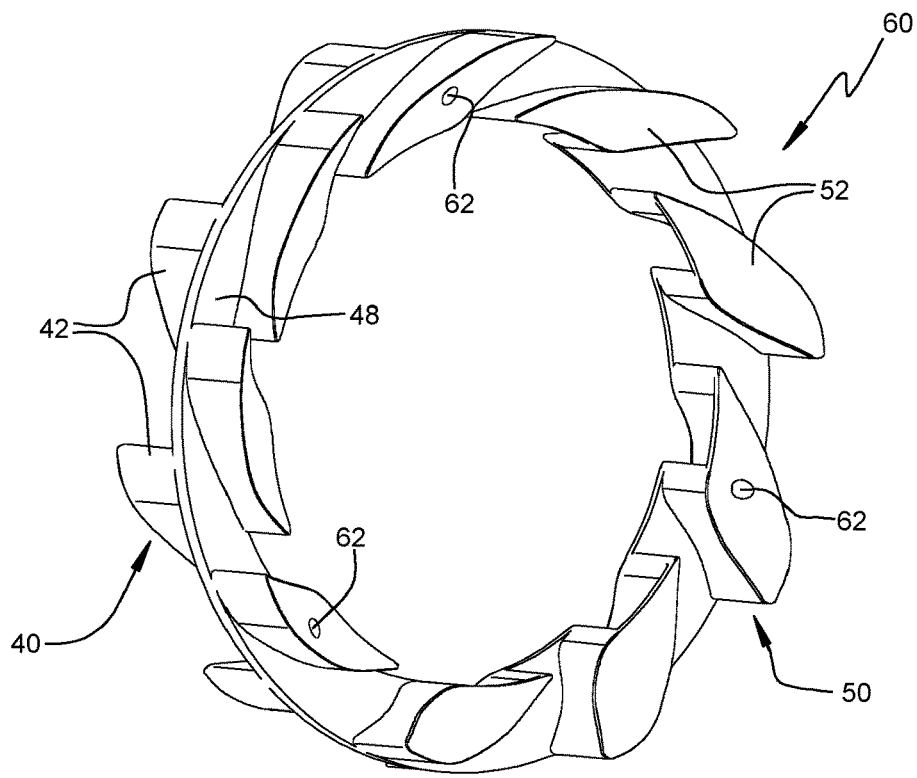
FIG. 4A is an isometric view of the nozzle ring component for the nozzle ring assembly of the first embodiment.
Figure 4B:
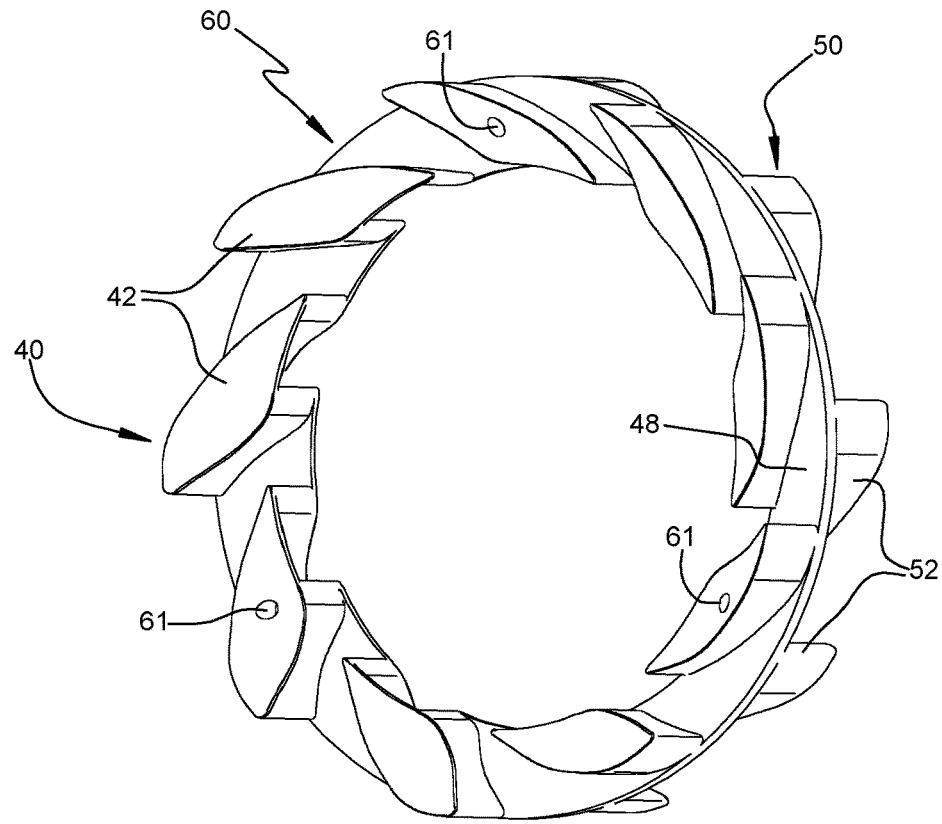
FIG. 4B is a further isometric view of the nozzle ring component of the first embodiment.

With reference to FIGS. 4A and 4B, the nozzle ring 60 includes the first vane ring 40 as previously described, comprising first vanes 42 circumferentially spaced about a circumference of the nozzle ring, and includes the second vane ring 50 comprising second vanes 52 circumferentially spaced about the circumference of the nozzle ring. The first and second vane rings are axially spaced and integrally joined to each other (and to the intervening partition 49). As previously noted, the first vanes 42 are circumferentially offset from the second vanes 52, the first vane passage entrances 44 are axially spaced apart from the second vane passage entrances 54 as shown in FIGS. 1 and 2, but the first vane passage exits are radially aligned with the second vane passage exits (i.e., the first and second vane passage exits are not axially spaced apart, but rather occupy substantially the same axial extent) as shown in FIG. 1, and they are circumferentially interleaved with one another.

Figure 5A:
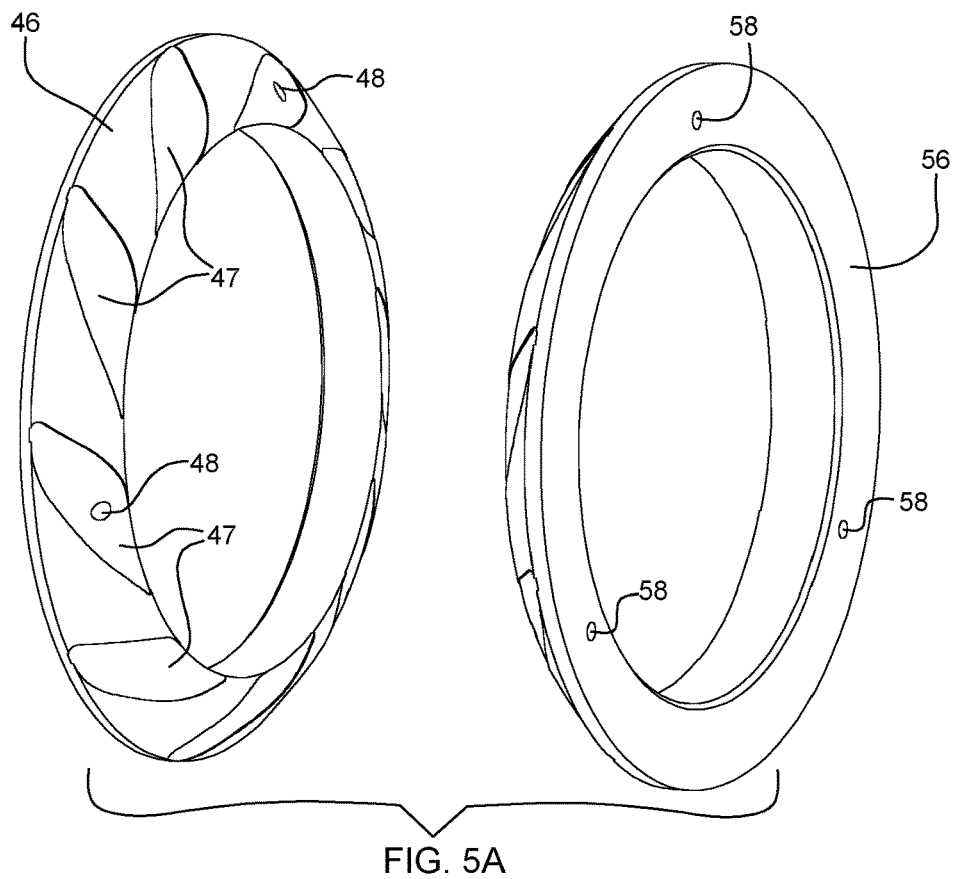
FIG. 5A is an exploded view of the first and second side walls for the nozzle ring assembly of the first embodiment.
Figure 5B:
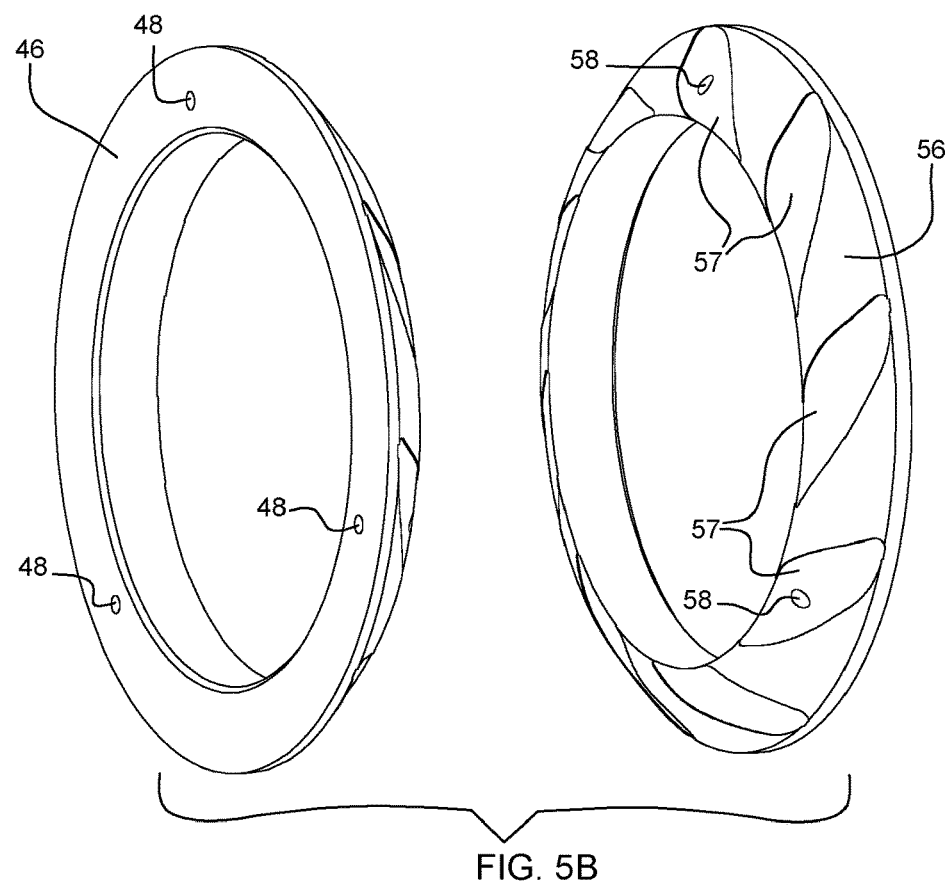
FIG. 5B is a further exploded view of the first and second side walls of the first embodiment.
Figure 6:
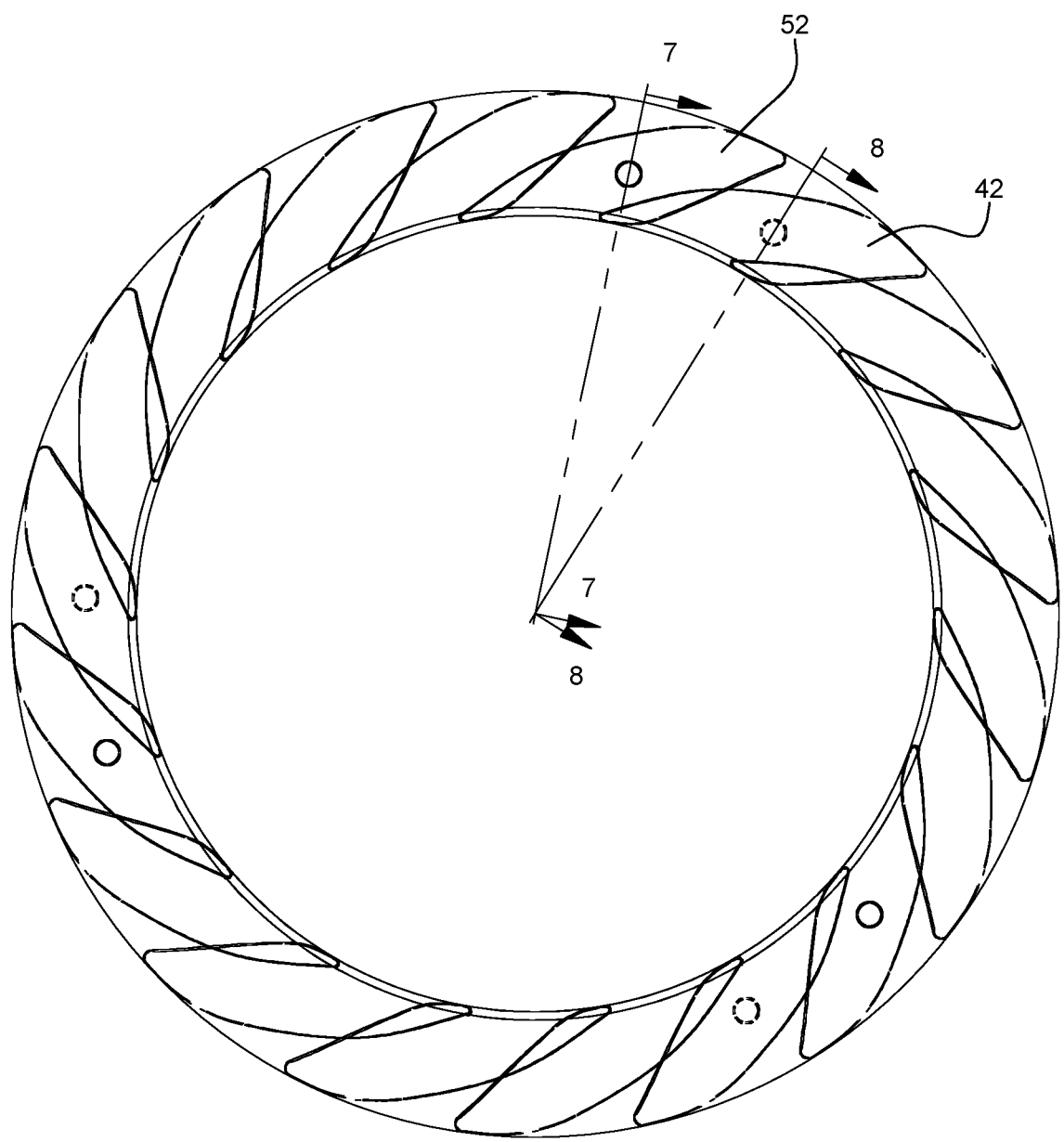
FIG. 6 is a diagrammatic end view of a nozzle ring assembly for explaining the locations of the cross-sectional views of FIGS. 7 and 8.

With reference to FIGS. 5A and 5B, the first side wall 46 is an annular (or ring-shaped) part whose axially outer face is generally planar. The outer diameter (OD) of the first side wall is substantially equal to a maximum diameter of the first vanes 42 at their leading edges (see FIG. 2), and the inner diameter (ID) of the first side wall is substantially equal to a minimum diameter of the first vanes at their trailing edges. An axial thickness of the first side wall is relatively smaller at the OD and increases in the radially inward direction, having substantially a maximum thickness at the ID. Thus, the inner face of the first side wall does not extend radially but rather is inclined with respect to the radial direction. The inner face defines a plurality of depressed vane receptacles 47 therein, each said depressed vane receptacle being configured to receive a distal end of a respective one of the first vanes 42. The depressed vane receptacles 47 mitigate or eliminate exhaust gas leakage between the distal ends of the first vanes and the inner face of the first end wall 46.

The second side wall 56 is substantially a mirror image of the first side wall, its inner face defining a plurality of depressed vane receptacles 57 for receiving distal ends of the second vanes 52, but the depressed vane receptacles 57 are circumferentially offset or "clocked" relative to the vane receptacles 47, corresponding to how the second vanes 52 are clocked relative to the first vanes 42 as previously described. The depressed vane receptacles 57 mitigate or eliminate exhaust gas leakage between the distal ends of the second vanes and the inner face of the second end wall 56.

Methods of assembling the nozzle ring 60 with the side walls 46 and 56 are now described with primary reference to FIGS. 3, 4A, 4B, 5A, 5B, 6, 7, and 8. The nozzle ring 60 defines a first pin receptacle 61 in the distal end of each of a plurality of circumferentially spaced first vanes 42, the illustrated embodiment showing three such first pin receptacles 61 (FIGS. 4A and 4B). Corresponding pin receptacles 48 are defined in the first side wall 46 (FIGS. 5A and 5B), each pin receptacle 48 in the first side wall being aligned with a corresponding pin receptacle 61 in the nozzle ring 60. Similarly, the nozzle ring defines a second pin receptacle 62 in the distal end of each of a plurality of circumferentially spaced second vanes 52, there being three such second pin receptacles 62 in the illustrated embodiment (FIGS. 4A and 4B). Corresponding pin receptacles 58 are defined in the second side wall 56 (FIGS. 5A and 5B).

Figure 7:
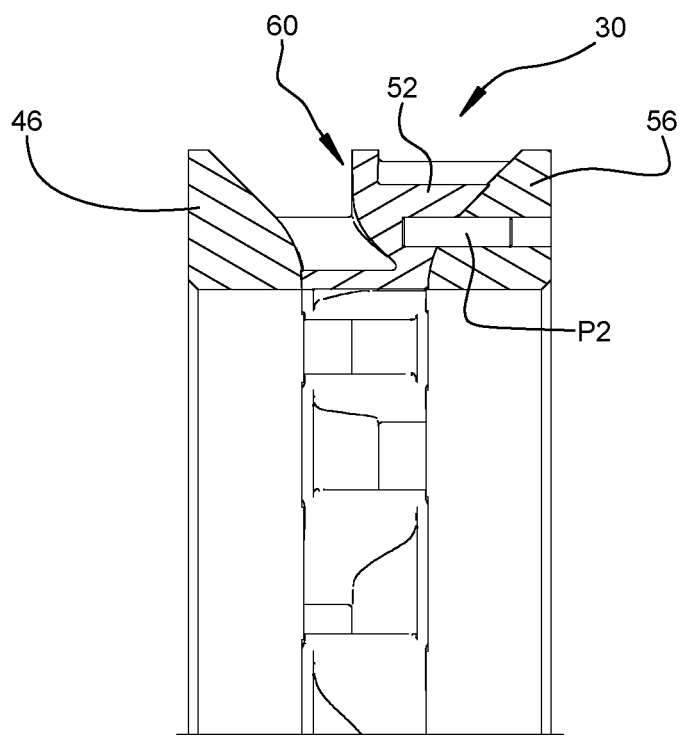
FIG. 7 is a cross-sectional view of the nozzle ring assembly in accordance with a first embodiment of the invention, along line 7-7 in FIG. 6.
Figure 8:
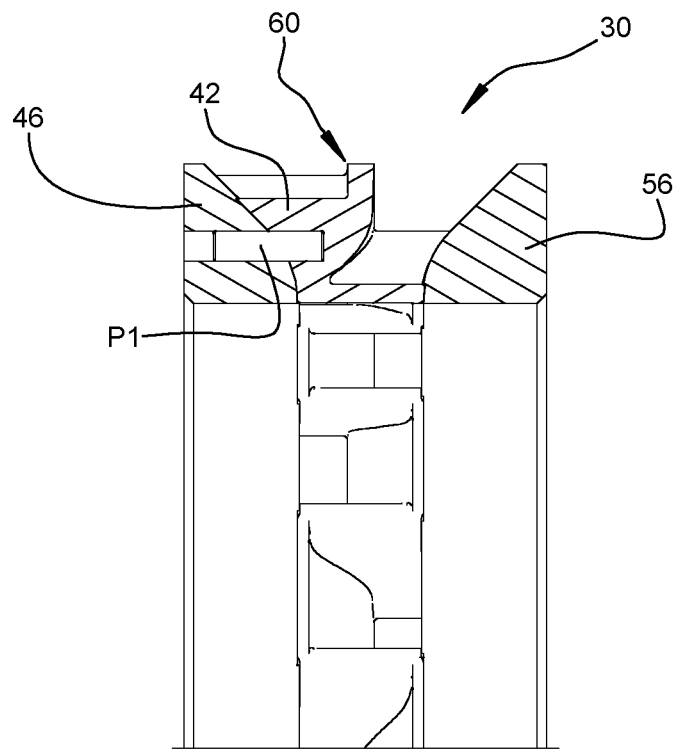
FIG. 8 is a cross-sectional view of the nozzle ring assembly in accordance with the first embodiment, along line 8-8 in FIG. 6.

With reference to FIGS. 3, 7, and 8, the first side wall 46 is affixed to one side of the nozzle ring 60 by first pins P1 that are press-fit into the pin receptacles 48 in the first side wall and into the first pin receptacles 61 in the nozzle ring as been seen in FIG. 8. Similarly, the second side wall 56 is affixed to the other side of the nozzle ring by second pins P2 that are press-fit into the pin receptacles 58 in the second side wall and into the second pin receptacles 62 in the nozzle ring as best seen in FIG. 7, thereby completing the assembly of the nozzle ring assembly 30 as shown in FIG. 2.

Figure 9A:
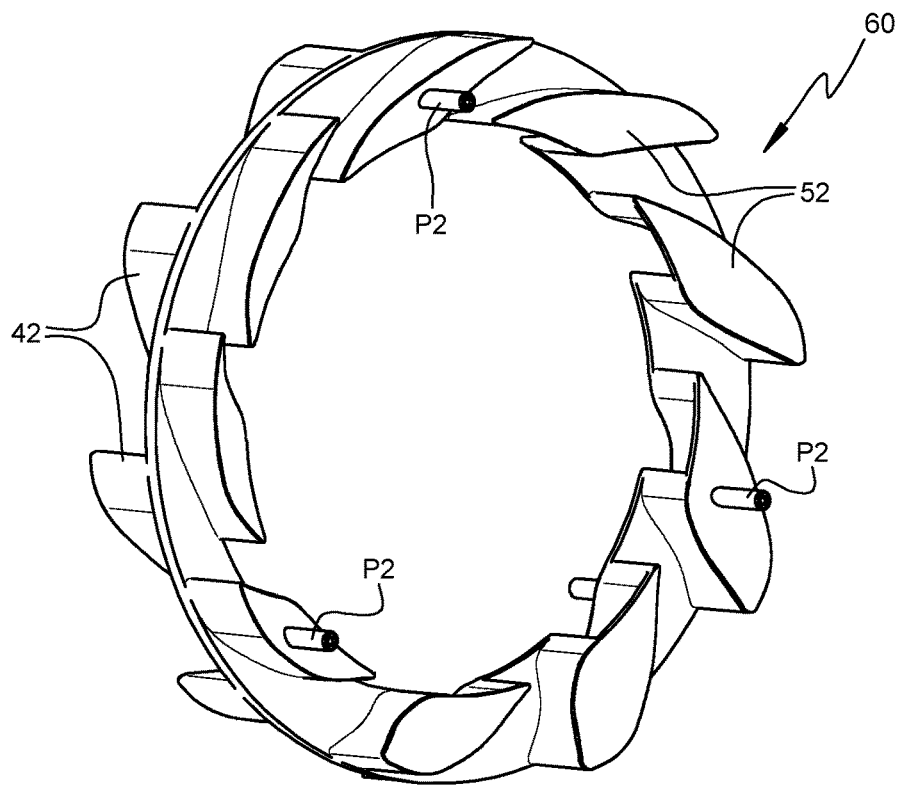
FIG. 9A is an isometric view of a nozzle ring component for the nozzle ring assembly in accordance with a second embodiment of the invention.
Figure 9B:
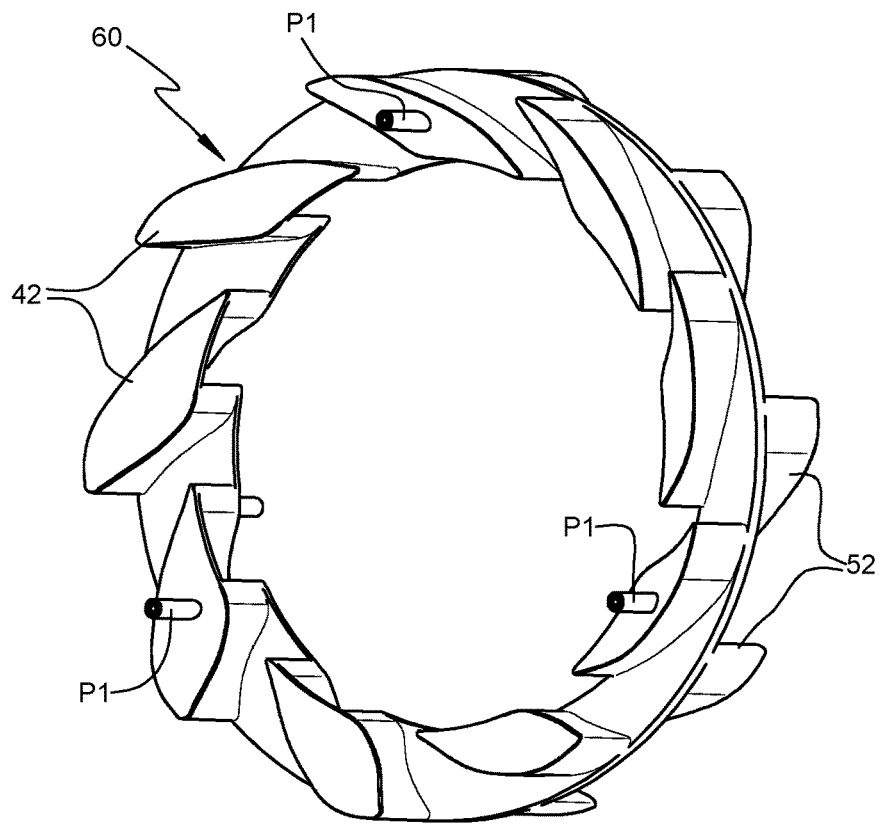
FIG. 9B is a further isometric view of the nozzle ring component of the second embodiment.
Figure 10:
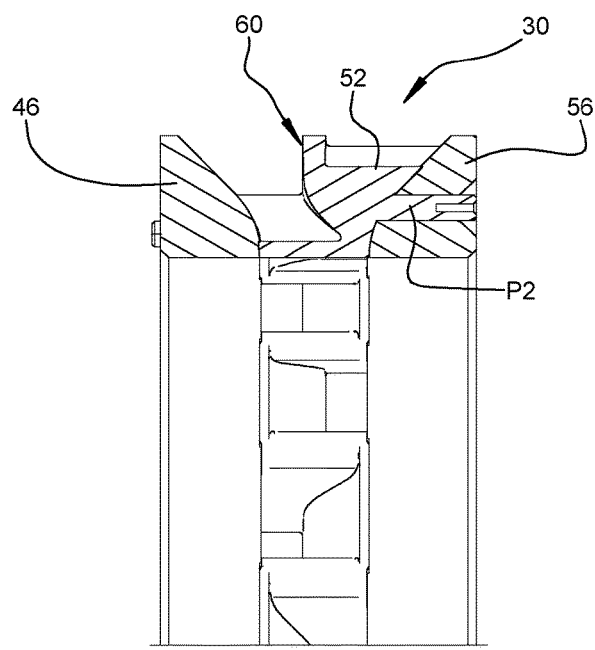
FIG. 10 is a cross-sectional view similar to that of FIG. 7, but for the second embodiment of the invention, in an intermediate stage of the assembly operation.
Figure 11:
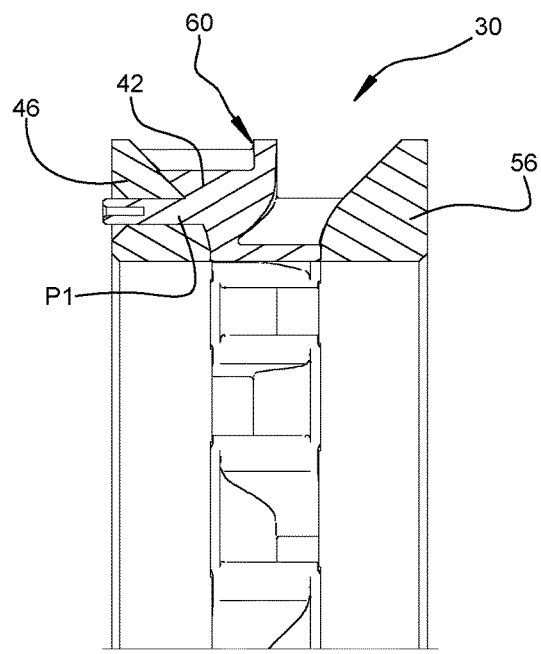
FIG. 11 is a cross-sectional view similar to that of FIG. 8, but for the second embodiment, in the intermediate stage of the assembly operation.
Figure 10A:
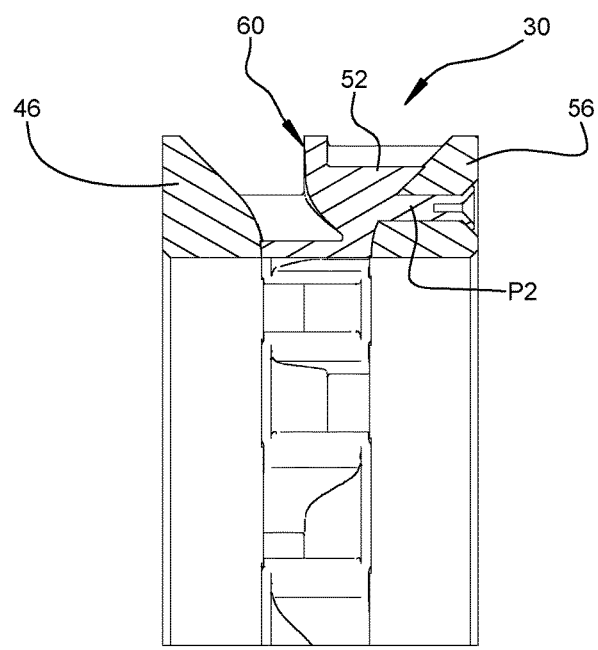
FIG. 10A is similar to FIG. 10 but shows the nozzle ring assembly of the second embodiment after the assembly operation is completed.
Figure 11A:
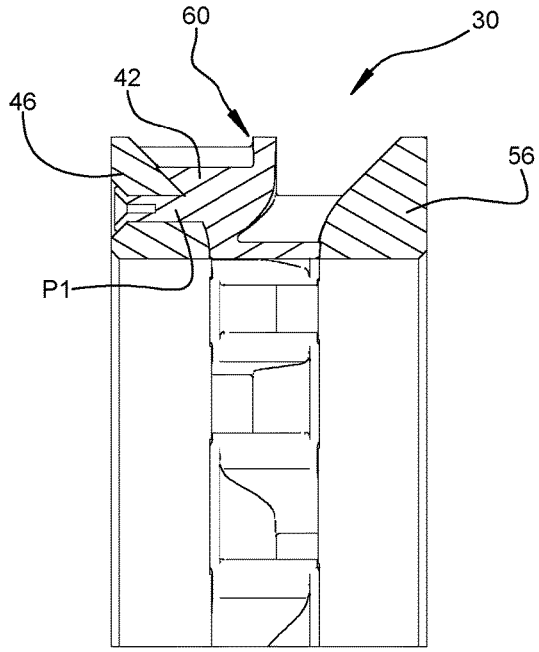
FIG. 11A is similar to FIG. 11 but shows the nozzle ring assembly of the second embodiment after the assembly operation is completed.

A second embodiment of the invention is illustrated in FIGS. 9A, 9B, 10, 10A, 11, and 11A. The second embodiment is generally similar to the first embodiment, except that the first pins P1 and second pins P2 are integral formations of the nozzle ring 60, as illustrated in FIGS. 9A and 9B. The first pins P1 are inserted into the pin receptacles 48 in the first side wall 46 (FIG. 11) and then are affixed therein, such as by riveting (FIG. 11A). Similarly, the second pins P2 are inserted into the pin receptacles 58 in the second side wall 56 (FIG. 10) and then are affixed therein, such as by riveting (FIG. 10A).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for making a twin-vaned nozzle ring assembly for a turbine nozzle of a turbocharger, the method comprising the steps of:
   (a) providing a first side wall as a ring-shaped part;
   (b) providing a second side wall as a ring-shaped part, the second side wall being formed separately from the first side wall;
   (c) providing a nozzle ring separately from the first and second side walls, wherein the nozzle ring is provided to have a first vane ring comprising first vanes circumferentially spaced about a circumference of the nozzle ring and is provided to have a second vane ring comprising second vanes circumferentially spaced about the circumference of the nozzle ring, the first and second vane rings being axially spaced and integrally joined to each other, the first vane ring defining first vane passages between circumferentially successive first vanes and extending from first vane passage entrances at leading edges of the first vanes to first vane passage exits at trailing edges of the first vanes, the second vane ring defining second vane passages between circumferentially successive second vanes and extending from second vane passage entrances at leading edges of the second vanes to second vane passage exits at trailing edges of the second vanes, wherein the first vanes are circumferentially offset from the second vanes, the first vane passage entrances are axially spaced apart from the second vane passage entrances, and the first vane passage exits coincide in axial extent and axial location with the second vane passage exits and are circumferentially interleaved with the second vane passage exits; and
   (d) joining the first side wall to a distal face of the first vane ring, and joining the second side wall to a distal face of the second vane ring.

2. The method of claim 1, wherein step (a) comprises providing the first side wall to include a plurality of depressed vane receptacles in a face of the first side wall that confronts the distal face of the first vane ring, each said depressed vane receptacle receiving a distal end of a respective first vane.

3. The method of claim 1, wherein step (b) comprises providing the second side wall to include a plurality of depressed vane receptacles in a face of the second side wall that confronts the distal face of the second vane ring, each said depressed vane receptacle receiving a distal end of a respective second vane.

4. The method of claim 1, wherein step (c) comprises making the nozzle ring by an injection molding process.

5. The method of claim 4, wherein the injection molding process comprises a metal injection molding (MIM) process.

6. The method of claim 1, wherein the first side wall and the first vane ring each is provided to define a plurality of circumferentially spaced pin receptacles, the pin receptacles of the first side wall being aligned with the pin receptacles of the first vane ring, and wherein step (d) comprises press-fitting pins into the pin receptacles of the first vane ring and into the pin receptacles of the first side wall.

7. The method of claim 1, wherein the second side wall and the second vane ring each is provided to define a plurality of circumferentially spaced pin receptacles, the pin receptacles of the second side wall being aligned with the pin receptacles of the second vane ring, and wherein step (d) comprises press-fitting pins into the pin receptacles of the second vane ring and into the pin receptacles of the second side wall.

8. The method of claim 1, wherein the first vane ring is provided to include a plurality of circumferentially spaced pins projecting from the distal face of the first vane ring, and the first side wall is provided to include a plurality of circumferentially spaced pin receptacles, and wherein step (d) comprises inserting the pins of the first vane ring into the pin receptacles of the first side wall and affixing the pins therein.

9. The method of claim 8, wherein the step of affixing the pins in the pin receptacles comprises riveting the pins.

10. The method of claim 1, wherein the second vane ring is provided to include a plurality of circumferentially spaced pins projecting from the distal face of the second vane ring, and the second side wall is provided to include a plurality of circumferentially spaced pin receptacles, and wherein step (d) comprises inserting the pins of the second vane ring into the pin receptacles of the second side wall and affixing the pins therein.

11. The method of claim 10, wherein the step of affixing the pins in the pin receptacles comprises riveting the pins.

* * * * *